(12) United States Patent
Stelmar Netto et al.

(10) Patent No.: US 11,126,524 B2
(45) Date of Patent: Sep. 21, 2021

(54) CONFIGURATION OF KEY-MAPPING

(71) Applicant: International Business Machines Corporation, Armonk, NY (US)

(72) Inventors: Marco Aurelio Stelmar Netto, São Paulo (BR); Thiago Rodrigues de Souza Costa, Belém (BR); Diego P. R. Franco, Belo Horiozonte (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/558,400

(22) Filed: Sep. 3, 2019

(65) Prior Publication Data

US 2021/0064496 A1 Mar. 4, 2021

(51) Int. Cl.
*G06F 3/02* (2006.01)
*G06F 11/30* (2006.01)
*G06N 20/00* (2019.01)
*G06F 9/4401* (2018.01)

(52) U.S. Cl.
CPC ........ *G06F 11/3051* (2013.01); *G06F 9/4411* (2013.01); *G06F 11/3041* (2013.01); *G06N 20/00* (2019.01)

(58) Field of Classification Search
USPC .................. 710/15, 18, 67, 73; 715/733–759
See application file for complete search history.

(56) References Cited

U.S. PATENT DOCUMENTS

| | | |
|---|---|---|
| 6,469,690 B1 | 10/2002 | Abraham |
| 7,385,584 B2 | 6/2008 | Segre |
| 7,893,923 B2 | 2/2011 | Robideaux |
| 9,313,822 B2 | 4/2016 | Thangella |

(Continued)

FOREIGN PATENT DOCUMENTS

| | | |
|---|---|---|
| CN | 2609031 Y | 3/2004 |
| CN | 104317417 B | 11/2017 |

OTHER PUBLICATIONS

Logitech, "All Systems Flow: Introducing Logitech Flow—Cross-Computer Control and File Sharing", Logitech, Accessed on Jul. 10, 2019, © 2019 Logitech, 9 pages, <https://www.logitech.com/en-US/product/options/page/flow-multi-device-control>.

(Continued)

*Primary Examiner* — Ilwoo Park
(74) *Attorney, Agent, or Firm* — William H. Hartwell; Isaac J. Gooshaw (57) ABSTRACT

A machine learning system for configuring input devices connected to a computer cluster is provided. A computing device analyzes one or more input devices connected to one or more computer device executing within a workstation. A computer device receives one or more signals from the one or more input devices connected to the one or more computer devices executing within the workstation. A computing device converts the one or more signals from the one or more input devices connected to the one or more computer devices executing within the workstation into one or more device data. A computing device analyzes the one or more device data from the one or more input devices connected to the one or more computer devices executing within the workstation. A computer device determines a detected pattern of device data, wherein a computer device generates a key-mapping command.

20 Claims, 4 Drawing Sheets

(56) References Cited

U.S. PATENT DOCUMENTS

| | | |
|---|---|---|
| 9,448,724 B2 | 9/2016 | Arnold |
| 2001/0032280 A1 | 10/2001 | Osakada |
| 2002/0105553 A1 | 8/2002 | Segre |
| 2011/0304543 A1 | 12/2011 | Chen |
| 2016/0127516 A1 | 5/2016 | Chazot |
| 2019/0235726 A1* | 8/2019 | Vasudev ................. H04L 67/22 |

OTHER PUBLICATIONS

Symless, "Synergy—Share One Mouse & Keyboard Across Computers", Symless, Accessed Jul. 10, 2019, © 2018 Symless, 3 pages, <https://symless.com/synergy>.

\* cited by examiner

CONFIGURATION OF KEY-MAPPING

BACKGROUND OF THE INVENTION

The present invention relates generally to the field of machine learning and more particularly to computer clusters.

In general, computer clusters are set of loosely or tightly connected computing devices that operate in tandem to run and execute programs. Computer clusters often operate under the pretense that each computing device operates to perform a specified task, unrelated to the other computing devices. Computing clusters are often developed to improve performance and availability to a user that a singular computer would be unable to.

SUMMARY

Embodiments of the present invention provide a method, system, and program product for machine learning to configure input devices connected to a computer cluster.

A first embodiment encompasses a method for machine learning to configure input devices connected to a computer cluster. One or more processors analyze one or more input devices connected to one or more computer devices executing within a workstation. The one or more processors receive one or more signals from the one or more input devices connected to the one or more computer devices executing within the workstation. The one or more processors convert the one or more signals from the one or more input devices connected to the one or more computer devices executing within the workstation into one or more device data. The one or more processors analyze the one or more device data from the one or more input devices connected to the one or more computer devices executing within the workstation. The one or more processors determine a detected pattern of device data. Responsive to determining a detected pattern of device data, the one or more processors generate a key-mapping command.

A second embodiment encompasses a computer program product for machine learning to configure input devices connected to a computer cluster. The computer program product includes one or more computer-readable storage media and program instructions stored on the one or more computer-readable storage media. The program instructions include program instructions to analyze one or more input devices connected to one or more computer devices executing within a workstation. The program instructions include program instructions to receive one or more signals from the one or more input devices connected to the one or more computer devices executing within the workstation. The program instructions include program instructions to convert the one or more signals from the one or more input devices connected to the one or more computer devices executing within the workstation into one or more device data. The program instructions include program instructions to analyze the one or more device data from the one or more input devices connected to the one or more computer devices executing within the workstation. The program instructions include program instructions to determine a detected pattern of device data. Responsive to determining a detected pattern of device data, program instructions include program instructions to generate a key-mapping command.

A third embodiment encompasses a computer system for machine learning to configure input devices connected to a computer cluster. The computer system includes one or more computer processors, one or more computer readable storage medium, and program instructions stored on the computer readable storage medium for execution by at least one of the one or more processors. The computer program product includes one or more computer-readable storage media and program instructions stored on the one or more computer-readable storage media. The program instructions include program instructions to analyze one or more input devices connected to one or more computer devices executing within a workstation. The program instructions include program instructions to receive one or more signals from the one or more input devices connected to the one or more computer devices executing within the workstation. The program instructions include program instructions to convert the one or more signals from the one or more input devices connected to the one or more computer devices executing within the workstation into one or more device data. The program instructions include program instructions to analyze the one or more device data from the one or more input devices connected to the one or more computer devices executing within the workstation. The program instructions include program instructions to determine a detected pattern of device data. Responsive to determining a detected pattern of device data, program instructions include program instructions to generate a key-mapping command.

DETAILED DESCRIPTION

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While possible solutions to computer clusters are known, these solutions may be inadequate to provide the necessary configuration of shortcuts and/or hotkeys for a user's workstation, because these solutions often incorporate an apparatus to toggle between utilization of input devices connected to one or more computing devices. Further, these apparatuses are physical switches that a user must physically toggle between.

Embodiments of the present invention recognize that computer clusters generally require a plurality of input devices that are utilized by a user to enable functionality of the computing cluster, which can be a major hindrance on productivity. Users often utilize different input devices to accomplish specific tasks on a plurality of computing devices, and often these tasks require the use of different input devices on different computing devices to accomplish the same task.

A problem remains with possible solutions insofar as a user is required to physically toggle between use of multiple input devices connected to one or more computing devices. Therefore, users require a method to be instructed to incorporate hotkeys and/or shortcuts to existing input devices that can be utilized across one or more computing devices and are compatible with one or more operating systems.

As an alternative to the aforementioned toggle switches for input devices connected to a computer cluster, the present invention offers a new mechanism for configuration of input devices by using machine learning to track a user's activity of input devices connected to a computer cluster. As opposed to a user toggling between one input device to another input device, a user receives a key-mapping suggestion that coaches the user to utilize one or more hotkeys and/or shortcuts and/or shortcuts to optimize the productivity of the user across a computer cluster comprising one or more computer devices that operate on one or more operating systems. Such an approach often yields an increase in productivity, since the user is not required to switch between different input devices connected to one or more computing devices. An embodiment thus uses a key-mapping suggestion that determines that a user's activity often starts a similar program on two separate computing devices utilizing different input devices, the key-mapping suggestion coaches a user to incorporate the key-mapping suggestion into the user's activity of a single input device that is capable of executing on the separate computing devices.

In one embodiment, computing environment 100 comprises computing device 120A, computing device 120B, computing device 120C, server area network 130, and workstation 140. Activity pattern program 132 analyzes one or more input devices (i.e., input devices 124A, input devices 124B, input devices 124C) connected to one or more computer devices (i.e., computing device 120A, computing device 120B, and computing device 120C) executing within a workstation (i.e., workstation 140). Activity pattern program 132 receives one or more signals form the one or more input devices connected to the one or more computer devices executing within workstation 140. Activity pattern program 132 converts the one or more signals received from the one or more input devices connected to the one or more computing devices executing within workstation 140 into one or more device data. Activity pattern program 132 analyzes the one or more device data from the one or more input devices connected to the one or more computer devices executing within workstation 140. Activity pattern program 132 determines based, at least in part, on the device data received from the one or more computing devices, a detected pattern of device data. Responsive to determining a detected pattern of device data, activity pattern program 132 generates a key-mapping command.

In one embodiment, activity pattern program 132 monitors a computing environment comprising (i) the workstation, (ii) the one or more input devices, and (iii) the one or more computing devices connected on a shared network. Additionally, activity pattern program 132 monitors the one or more input devices to communicate, at least, a first signal from, at least, one input device from the one or more input devices. Activity pattern program 132 communicates a set of program instructions to operating programs 122A-C to communicate any received signals from the one or more input devices (i.e., input devices 124A-C). Operating programs 122A, operating programs 122B, and operating programs 122C operate to receive a first signal from, at least, the one input device from the one or more input devices. Operating programs 122A-C executing on the computing devices within workstation 140 operate to communicate the first received signal to activity pattern program 132. Activity pattern program 132 coverts the first received signal to a first received device data. Additionally, activity pattern program 132 monitors for one or more signals from the one or more input devices within computing environment 100. Alternatively, activity pattern program 132 communicates a set of program instructions to operating programs 122A-C instructing operating programs 122A-C to continuously monitor for one or more signals from the one or more input devices.

In one embodiment, activity pattern programs 132 analyzes the first received device data. Activity pattern program 132 identifies within the first received device data (i) the content of the device data, (ii) the input device the device data is associated with, and (iii) which computing device the input device is connected to. Additionally, activity pattern program 132 identifies an action performed with the first received device data that is associated, at least, with (i) the content of the device data and (ii) the input device the device data is associated with. Activity pattern program 132 stores the first received device data on database 134.

In one embodiment, activity pattern program 132 receives a plurality of device data from the one or more input devices. Activity pattern program 132 analyzes the received plurality of device data. Activity pattern program 132 identifies within the received plurality of device data (i) the content of the received plurality of device data, (ii) the input device the received plurality of device data is associated with, and (iii) which computing device the input device is connected to. Additionally, activity pattern program 132 identifies an action performed with the received plurality of device data that is associated, at least, with (i) the content of the received plurality of device data and (ii) the input device the received plurality of device data is associated with. Activity pattern program 132 stores the received plurality of device data on database 134. Activity pattern program 132 analyzes the device data stored on database 134. Activity pattern program 132 identifies the detected pattern of device data that is associated with (i) one or more input devices, (ii) one or more computing devices, and (iii) one or more actions performed on the one or more computing devices.

In one embodiment, responsive to identifying the detected pattern of device data, activity pattern program 132 determines, by the one or more processors, a first detected pattern of device data that is associated with (i) an input device and (ii) a computing device.

In one embodiment, responsive to determining a first detected pattern of device data, activity pattern program 132 configures, by the one or more processors, a first shortcut associated with (i) an input device and (ii) a computing device, wherein, the first shortcut is configured to a single input device connected to a first computing device within workstation 140 that controls a functionality shared between a plurality of computing devices within the workstation. Activity pattern program 132 generates a first key-mapping command that is associated with the first detected pattern of device data. Upon generation of the first key-mapping command, activity pattern program 132 communicates the first key-mapping command to a first computing device within the workstation.

In one embodiment, activity pattern program 132 communicates the first key-mapping command to a user of the workstation. Activity pattern program 132 communicates a set of program instructions to operating programs 122A-C with instructions to prompt the user of workstation 140 to validate the first key-mapping command. Responsive to the user of workstation 140 validating the first key-mapping, activity pattern program 132 communicates an additional set of program instructions to operating programs 122A-C to incorporate the functionality of the first key-mapping command to a single input device connected to a first computing device within the workstation. Lastly, activity pattern program 132 monitors the computing environment comprising (i) the workstation, (ii) the one or more input devices, and (iii) the one or more computing devices connected on a shared network for a plurality of additional signals from the one or more input devices. Alternatively, activity pattern program 132 communicates a set of program instructions to operating programs 122A-C instructing operating programs 122A-C to monitor the computing environment comprising (i) the workstation, (ii) the one or more input devices, and (iii) the one or more computing devices connected on a shared network for a plurality of additional signals from the one or more input devices.

The present invention will now be described in detail with reference to the Figures.

Figure 1:
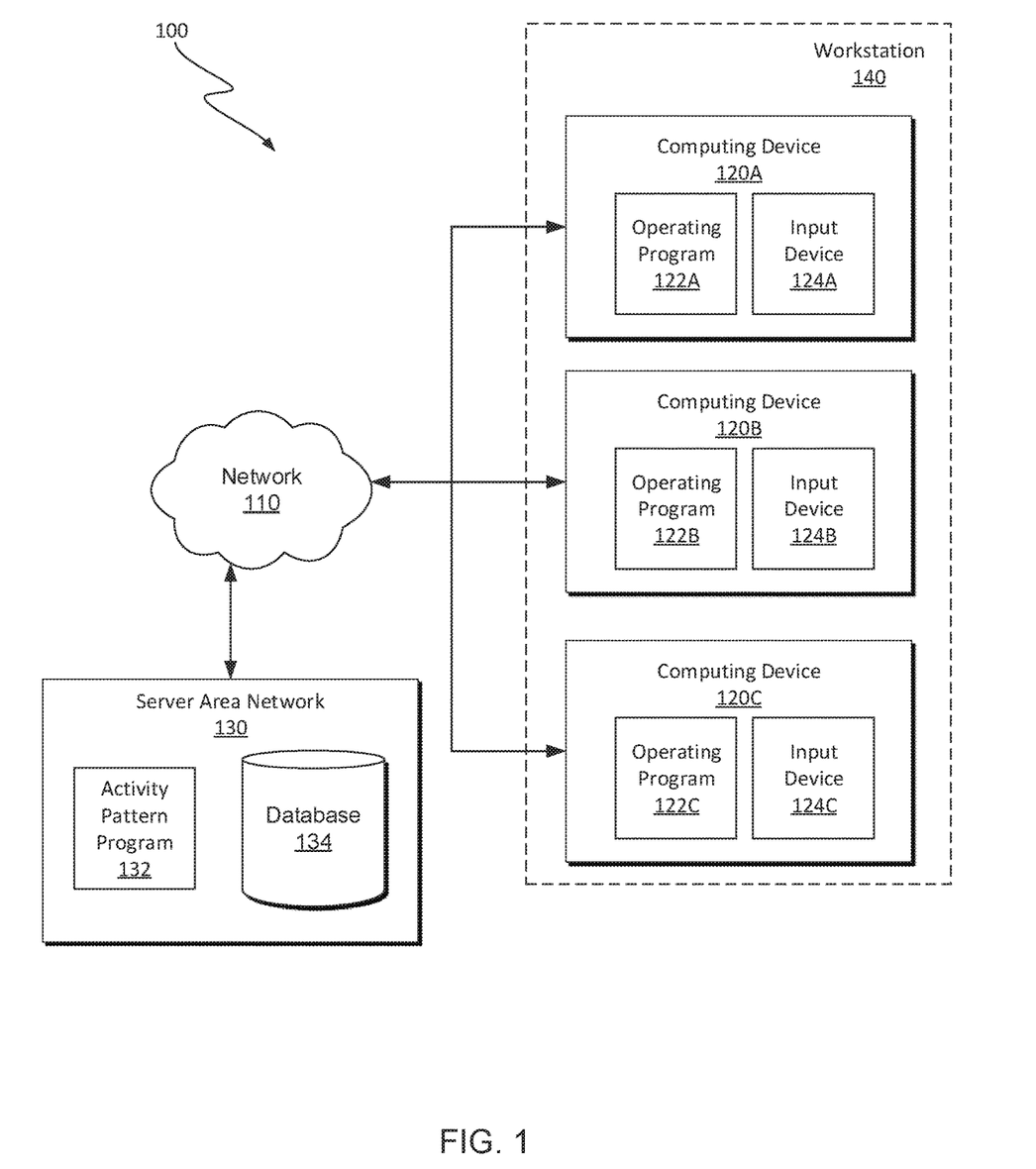
FIG. 1 is a functional block diagram illustrating a computing environment, in which input devices connected to a computer cluster are configured through machine learning, accordance with an exemplary embodiment of the present invention.

FIG. 1 is a functional block diagram illustrating a computing environment, generally designated 100, in accordance with one embodiment of the present invention. Computing environment 100 includes computing device 120A, computing device 120B, computing device 120C (generally designated as "computing devices 120A-C"), and server area network 130 (SAN 130) connected over network 110. Computing device 120A includes operating program 122A and input device 124A, computing devices 120B includes operating program 122B and input device 124B, and computing devices 120C includes operating program 122C and input device 124C (generally designated as "operating programs 122A-C" and "input devices 124A-C"). SAN 130 includes activity pattern program 132 and database 134.

In various embodiments of the present invention, computing device 120A, computing device 120B, and computing device 120C are computing devices that can be a standalone device, a server, a laptop computer, a tablet computer, a netbook computer, a personal computer (PC), a personal digital assistant (PDA), a smartwatch, a desktop, a cellular device (i.e., a cellphone) or any programmable electronic device capable of receiving, sending, and processing data. In general, computing devices 120A-C represent any programmable electronic device or combination of programmable electronic devices capable of executing machine readable program instructions and communication with SAN 130. In another embodiment, computing device 120A, computing device 120B, and computing device 120C represent a computing system utilizing clustered computers and components to act as a single pool of seamless resources. In general, computing device 120A, computing device 120B, and computing device 120C can be any computing device or a combination of devices with access to SAN 130 and network 110 and is capable of executing operating programs 122A-C and input devices 124A-C. Computing device 120A, computing device 120B, and computing device 120C may include internal and external hardware components, as depicted and described in further detail with respect to FIG. 1.

In this exemplary embodiments, operating programs 122A-C and input devices 124A-C are stored on computing devices 120A-C, respectively. However, in other embodiments, operating programs 122A-C and input devices 124A-C may be stored externally and accessed through a communication network, such as network 110. Network 110 can be, for example, a local area network (LAN), a wide-area network (WAN) such as the Internet, or a combination of the two, and may include wired, wireless, fiber optic or any other connection known in the art. In general, network 110 can be any combination and protocols that will support communication between computing devices 120A-C and SAN 130, in accordance with a desired embodiment of the present invention.

Computing devices 120A-C include one or more interfaces. These interfaces provide an interface between computing device 120A, computing device 120B, computing device 120C, and SAN 130. In some embodiments, the interfaces can be a graphical user interface (GUI) or a web user interface (WUI) and can display text, documents, web browser, windows, user options, application interfaces, and instructions for operation, and includes the information (such as graphic, text, and sound) that a program present to a user and the control sequences the user employs to control the program. In some embodiments, computing devices 120A-C access data communicated from SAN 130 via a client-based application that runs on computing devices 120A-C. For example, computing devices 120A-C include mobile application software that provides an interface between computing devices 120A-C and SAN 130.

Operating programs 122A-C and input devices 124A-C are depicted in FIG. 1 for illustrative simplicity, computing devices 120A-C, however, can include any number of programs and/or applications that are managed in accordance with operating programs 122A-C. In general, operating programs 122A-C represent a physical or virtual resource to which the user represented by computing devices 120A-C wishes to manage access. In some embodiments, operating program 122A-C represents control over a physical or virtual resource and input devices 124A-C manages the ability to use and modify the resource. Operating programs 122A-C can also represent any combination of the aforementioned elements. To illustrate various aspects of the present invention, examples of operating programs 122A-C represents one or more of: key-mapping command, a user profile transaction, or an activity pattern machine learning transaction, are presented, but embodiments of operating programs 122A-C are not limited thereto. Embodiments of the present invention recognize that operating programs 122A-C may include other forms of transactions and/or requests that are known in the art.

In various embodiments of the present invention, workstation 140 is depicted for illustrative simplicity and can include any number of computing devices without departing from the scope of the invention. In various embodiments, workstation 140 represents a cluster of computing devices which can include, but is not limited to, a standalone device, a server, a laptop computer, a tablet computer, a netbook computer, a personal computer (PC), a personal digital assistant (PDA), a smartwatch, a desktop, a cellular device (i.e., a cellphone) or any programmable electronic device capable of receiving, sending, and processing data. The present invention recognizes that computing devices 120A-C reside within workstation 140 and are capable of communicating between each device through wireless connection, hardwire and software connections, it is also feasible that one or more of computing devices 120A-C reside outside of workstation 140, but still be included in computing environment 100 and can communicate with the computing devices within workstation 140 through hardware and software connections.

In various embodiments of the present invention, server area network (SAN) 130 is a storage system that includes activity pattern program 132 and database 134. SAN 130 may include one or more, but is not limited to, computing devices, server, server-cluster, web servers, database and storage devices. SAN 130 operates to communicate with computing device 120 and other various computing devices over a network, such as network 110. For example, SAN 130 communicates with operating programs 122A-C to transfer data between, but is not limited to, database 134, input devices 124A-C, various other databases (not shown) and various other input devices (not shown) that are connected to network 110. In general, SAN 130 can be any computing device or a combination of devices that are communicatively connected to a local IoT network, i.e., a network comprised of various computing devices including, but are not limited to computing device 120, to provide the functionality described herein. SAN 130 can include internal and external hardware components with respect to FIG. 4. The present invention recognizes that FIG. 1 may include any number of computing devices, servers, databases and/or storage devices, and the present invention is not limited to only what is depicted in FIG. 1. As such, in some embodiments, some or all of the features and functions of SAN 130 are included as part of computing devices 120A-C and/or another computing device. Similarly, in some embodiments, some of the features and functions of computing devices 120A-C are included in part of SAN 130 and/or another computing device.

Additionally, in some embodiments, SAN 130 represents a cloud computing platform. Cloud computing is a model or service delivery for enabling convenient, on demand network access to a shared pool of configurable computing resources (e.g., networks, network bandwidth, servers, processing, memory, storage, applications, virtual machines, and services) that can be rapidly provisioned and released with minimal management effort or interaction with a provider of a service. A cloud model may include characteristics such as on-demand self-service, broad network access, resource pooling, rapid elasticity, and measured service, can be represented by service models including platform as a service (PaaS) model, an infrastructure as a service (IaaS) model, and a software as a service (SaaS)model; and can be implemented as various deployment models including as a private cloud, a community cloud, a public cloud, and a hybrid cloud.

In this exemplary embodiment, activity pattern program 132 and database 134 are stored on SAN 130. However, in other embodiments, activity pattern program 132 and database 134 may be stored externally and accessed through a communication network, such as network 110. In an alternative embodiment, activity pattern program 132 and database 134 may be stored on one or any combination of computing devices within workstation 140, such as computing device 120A, computing device 120B, or computing device 120C. Network 110 can be, for example, a local area network (LAN), a wide area network (WAN) such as the Internet, or a combination of the two, and may include wired, wireless, fiberoptic or any other connection known in the art. In general, network 110 can be any combination of connections and protocols that will support communications between computing devices 120A-C and SAN 130, in accordance with a desired embodiment of the present invention.

In the embodiment depicted in FIG. 1, activity pattern program 132, at least in part, has access to operating program 122A, operating program 122B, and operating program 122C and can communicate data stored on SAN 130 to computing device 120A, computing device 120B, computing device 120C, respectively.

Activity pattern program 132 is depicted in FIG. 1 for illustrative simplicity, SAN 130, however, can include any number of programs and/or application that are managed in accordance with activity pattern program 132. In general, activity pattern program 132 represents a physical or virtual resource to which the administrator of the program represented by SAN 130 wishes to manage access. In some embodiments, activity pattern program 132 represents information and database 134 manages the ability to retrieve the information. In some embodiments, activity pattern program 132 represents code that provides an ability to take specific action with respect to another physical or virtual resource. In some embodiments, activity pattern program 132 represents control over a physical or virtual resource and activity pattern program 132 manage the ability to use and modify the resource. Activity pattern program 132 can also represent any combination of the aforementioned elements. To illustrate various aspects of the present invention, examples of activity pattern program 132 are presented in which activity pattern program 132 represents one or more of: key-mapping command, a user profile transaction, or an activity pattern machine learning transaction, are presented, but embodiments of activity pattern program 132 are not limited thereto. Embodiments of the present invention recognize that activity pattern program 132 may include other forms of transactions and/or requests that are known in the art.

In the embodiment depicted in FIG. 1, activity pattern program 132 utilizes, at least in part, the data stored on database 134 to manage access to operating programs 122A-C in response to a key-mapping command based on a pattern of activity received from computing devices 120A-C that is based, at least in part, on the activity of user of workstation 140 utilizing various input devices (i.e., input devices 124A-C).

In various embodiments of the present invention, workstation 140 comprises one or more computing devices (i.e., computing device 120A, computing device 120B, and computing device 120C). Additionally, the present invention recognizes that workstation 140 includes any number of computing devices, and computing environment 100 depicted in FIG. 1 is illustrated for simplicity. In various embodiments, a user of workstation 140 utilizes one or more computing devices that communicatively connected through wired or wireless communications (i.e., hardware, wireless connection, etc.) Additionally, the one or more computing devices include, but is not limited to, one or more input devices (i.e., input devices 124A-C). One having ordinary skill in the art would understand that input devices represent external and internal devices that assist in the functionality of the computing device, respectively.

In one embodiment and example, computing device 120A represent a PC and input device 124A includes, but is not limited to, a keyboard, a mouse, a webcam, printer, and a fingerprint scanner that are communicatively connected to computing device 120A through wired or wireless connections. Additionally, computing device 120B represents a tablet computer and/or smartphone, and input device 124B includes, but is not limited to, a touch screen, a fingerprint scanner, a camera, and one or more external buttons. The present invention recognizes that a tablet computer and/or smartphone include external buttons that include, but are not limited to, home screen button, lock screen button, volume buttons, etc. Lastly, computing device 120C represents a laptop computer and input devices 124C includes, but is not limited to, an internal keyboard, a trackpad, an internal webcam, an internal microphone, and touch-based OLED bar. In this embodiment and example, a user of workstation 140 has access to one or any combination of the input devices described above. Additionally, operating programs 122A-C recognize and respond to actions performed by the input devices through the user. In various embodiments, operating programs 122A-C receive input data from the one or more input devices (i.e., actions) and stores the data.

In various embodiments of the present invention, activity pattern program 132 communicates with operating programs 122A-C and requests input data based, at least in part, on the input data that operating programs 122A-C receive from input devices 124A-C. In some embodiments, activity pattern program 132 communicates a set of program instructions instructing operating programs 122A-C to periodically communicate the input data to activity pattern program 132. In an alternative embodiment, operating programs 122A-C communicate the input data to activity pattern program 132 each time operating programs 122A-C receive input data from the one or more input devices (i.e., input devices 124A-C). One having ordinary skill in the art would understand that periodically represent time periods and includes, but is not limited to, defined time periods (e.g., 12 pm, 2 pm, etc.) and undefined time periods (every 2 hours, every 4 hours, etc.).

In various embodiments depicted in FIG. 1, input data is, at least in part, data obtained from input devices 124A-C. Input devices 124A-C can include, but are not limited to, keyboards, mice, fingerprint scanners, printers, web cams, microphones, touch-based OLED screens, etc. In various embodiments of the present invention, input devices 124A-C are communicatively connected such as, but not limited to, wired or wireless. Input devices 124A-C operate to monitor and transmit data from computing devices to activity pattern program 132. In some embodiments, input devices 124A-C operate to communicate data to operating programs 122A-C.

In some embodiments of the present invention, activity pattern program 132 operates to transmit a key-mapping command (i.e., query processing) to a user of workstation 140 and configure computing devices 120A-C and/or present feedback (i.e., coaching) that computing devices 120A-C receives from activity pattern program 132 in response to the key-mapping command. In some embodiments operating programs 122A-C also represents one or more elements of activity pattern program. For example, operating programs 122A-C can include functionality for analyzing the input data from input devices 124A-C, as described herein. The interfaces included on computing devices 120A-C can also represent a user interface ("UI") that operates to provide a UI (e.g., graphical user interface ("GUI")) to a user of workstation 140. In certain such embodiments, the UI of the interfaces included on computing devices 120A-C operate to receive user input from the user of workstation 140, thereby enabling the user to interact with operating programs 122A-C executing on computing devices 120A-C, respectively. In certain such embodiments, the UI of operating programs 122A-C can also operate to enable the user to access and/or interact with SAN 130 through the authentication of the user via activity pattern program 132. In certain such embodiments, it is to be understood that computing environment 100 can include a plurality of computing devices without departing from the scope of the present invention.

In various embodiments of the present invention, operating programs 122A-C monitor the respective computing device (i.e., computing device 120A, etc.) to determine which input devices are connected to the computing device. In some embodiments, operating programs 122A-C determine that one or more input devices is connected to one or more computing devices. In some embodiments operating programs 122A-C store this data (i) on the respective computing device or (ii) on a database (e.g., database 134). The present invention recognizes that a user of workstation 140 utilizes input devices 124A-C to control and manipulate data presented by operating programs 122A-C to the user of workstation 140 which comprises computing devices 120A-C.

In various embodiments, the user of workstation 140 utilizes input devices 124A-C to manipulate and control data presented to the user, as described above. Additionally, input devices 124A-C communicate signals to operating programs 122A-C, respectively, indicating activity on computing devices 120A-C, respectively, by the user. The present invention recognizes that these signals represent actions taken by the user to control and/or manipulate data, and operating programs 122A-C store the signals as input data.

In various embodiments of the present invention, activity pattern program 132 represents a machine learning model that analyzes input data based, at least in part, on user activity of input devices 124A-C. Activity pattern program 132 receives one or more input data based on, at least, user activity utilizing one or more input devices that are connected to one or more computing devices within workstation 140. In various embodiments, activity pattern program 132 collects the input data and stores the data on database 134. Additionally, once activity pattern program 132 receives a threshold level of input data, wherein activity pattern program 132 reasonably determines a key-mapping layout for the user of workstation 140, generates a key-mapping command and communicates the key-mapping command to computing devices 120A-C with a set of program instructions to communicate (i.e., coaching) the key-mapping layout to the user of workstation 140. One having ordinary skill in the art would understand that a threshold level describes a measurable amount of data for activity pattern program 132 to determine a key-mapping layout for a user of workstation 140.

In one embodiment and example of the present invention, the environment depicted in FIG. 1 comprises one or more computing devices (i.e., computing devices 120A-C) that contain one or more input devices (i.e., input devices 124A-C) connected over a network, such as network 110. The input devices communicate a signal to the operating program (i.e., operating programs 122A-C) based, at least in part, on the activity performed by the user of workstation 140. In various embodiments, the user utilizes the input devices to perform an action directed towards the computing device. These actions include, but are not limited to, clicking of a link presented on computing device 120A using a mouse, typing on a keyboard and/or using keys on a keyboard as hotkeys to perform an action, utilizing a webcam to control what is viewed on the screen with hand movements, utilizing a touch-based OLED screen to perform actions on a computing device, etc. Operating programs 122A-C receive a signal from an input device every time a user performs an action. Additionally, operating programs 122A-C store these signals as data to be utilized by activity pattern program 132, periodically.

In various embodiments of the present invention, activity pattern program 132 requests the input data from operating programs 122A-C, as described above. Activity pattern program 132 analyzes the input data and records the input data based, at least in part, on the specific activity performed by the user. In one embodiment and example, the user utilizes the left-click of a mouse to highlight a sequence of words and/or numbers that were previously written on an application and/or program. Alternatively, in a second embodiment example, the user utilizes the "F2" key on a keyboard as a hotkey to highlight a sequence of words and/or numbers that were previously written on an application and/or program. In these embodiments and examples, activity pattern program 132 identifies that the activity being performed by the user is to highlight words and/or numbers written on an application and/or program. In various embodiments activity pattern program 132 stores the input data on a database (e.g., database 134) and assigns metadata that identifies this input data as hotkey activity. The present invention recognizes that a user utilizes various input devices to perform actions on a computing device, as described above.

In various embodiments of the present invention, operating programs 122A-C receive one or more input data that is associated with user activity performing actions on an application and/or program on computing devices 120A-C. In some embodiments, operating program 122A receives input data from input devices 124A from user activity performing actions on computing device 120A. In another embodiment, operating program 122B receives input data from input devices 124B from user activity performing actions on computing device 120B. In yet another embodiment, operating program 122C receives input data from input devices 124C from user activity performing actions on computing device 120C. In various embodiments, activity pattern program 132 requests the input data from operating programs 122A-C. In an alternative embodiment, operating programs 122A-C communicate the input data to activity pattern program 132, periodically.

In various embodiments of the present invention, activity pattern program 132 receives one or more input data from operating programs 122A-C. Activity pattern program 132 analyzes the input data and identifies one or more actions based, at least in part, on the input data. In one example and embodiment, activity pattern program 132 identifies a first input data as a left click on a mouse to highlight words and./or numbers on an application and/or program. In a second embodiment and example, activity pattern program 132 identifies a second input data as a user utilizing a finger to tap and hold on a touch-based OLED screen to highlight a portion of words and/or numbers on an application and/or program. In a third embodiment and example, activity pattern program 132 identifies a third input data, wherein the user presses "F1" to activate a specific application and/or program on a computing device. In various embodiments, activity pattern program 132 identifies each input data and associates a type of action with each input data and stores the input data and the type of action on a database (e.g., database 134).

In various embodiments, activity pattern program 132 operates to analyze the stored input data to determine a key-mapping command to communicate to operating programs 122A-C. In some embodiments, activity pattern program 132 analyzes the stored input data once the amount of input data reaches a threshold level, as described above. In some embodiments, activity pattern program 132 analyzes the input data and identifies one or more repetitions of input data from the one or more computing devices utilizing one or more input devices. In one embodiment and example, activity pattern program 132 identifies based, at least in part, on the input data, that the user utilizes a mouse to start a first program on computing device 120A and activity pattern program 132 identifies that the user utilizes a touch-based OLED screen to start the first program on computing device 120B. Based, at least in part on, activity pattern program 132 identifying that, at least, the user utilizes two input devices to start the first program on computing device 120A and computing device 120B, determines to configure the input devices so that the user utilizes one input device to perform the action of starting the first program on computing device 120A and computing device 120B. In some embodiments, activity pattern program 132 operates to generate a key-mapping command that directs the user to press "F1" on a keyboard connected to computing device 120A to start the first program on computing device 120A and computing device 120B.

In various embodiments of the present invention, activity pattern program 132 monitors the input data received from operating programs 122A-C and acting as machine learning, identifies a sequence of actions by a user utilizing input devices 124A-C. Activity pattern program 132 identifies actions between (i) one or more computing devices and (ii) one or more input devices connected to the one or more computing devices to determine whether the input data was performed previously on one more computing devices. Activity pattern program 132 identifies a detected pattern of input data that is associated with (i) one or more computing devices and (ii) one or more input devices, as described above. In response to identifying a detected pattern of input data, activity pattern program 132 generates a key-mapping command that comprises a configurable shortcut for a user of workstation 140. Additionally, the key-mapping command includes, but is not limited to, shortcuts or hotkeys to perform actions on computing devices 120A-C. In various embodiments, the shortcuts or hotkeys allow a user of workstation 140, based, at least in part, on the detected pattern of input data, to start a program and/or application by utilizing a single input device connected to a single computing device.

In various embodiments, activity pattern program 132 generates a key-mapping command that includes, but is not limited to, a key-mapping layout. In some embodiments, the key-mapping layout describes various shortcuts or hotkeys associated with a single input device that the user of workstation 140 can utilize to optimize the layout of input devices 124A-C. In some embodiments, activity pattern program 132 communicates the key-mapping command to operating programs 122A-C with a set of program instructions to communicate and coach the user of workstation 140 to utilize the key-mapping command into input devices 124A-C. Additionally, activity pattern program 132 configures input devices 124A-C to incorporate the key-mapping command to optimize the layout and use of input devices 124A-C. Additionally, in some embodiments, activity pattern program 132 communicates a decision to the user of workstation 140, wherein activity pattern program 132 communicates the decision to operating program 122A-C to present to the user of workstation 140, asking the user of workstation 140 whether the user would like to incorporate the key-mapping command into the existing layout of input devices 124A-C. Alternatively, the user of workstation 140 can select a preset that authorizes activity pattern program 132 to automatically configure input devices 124A-C with one or more key-mapping commands, wherein activity pattern program 132 communicates a set of program instructions with every key-mapping command to communicate and coach the user of workstation 140 to utilize the one or more key-mapping commands.

Figure 2:
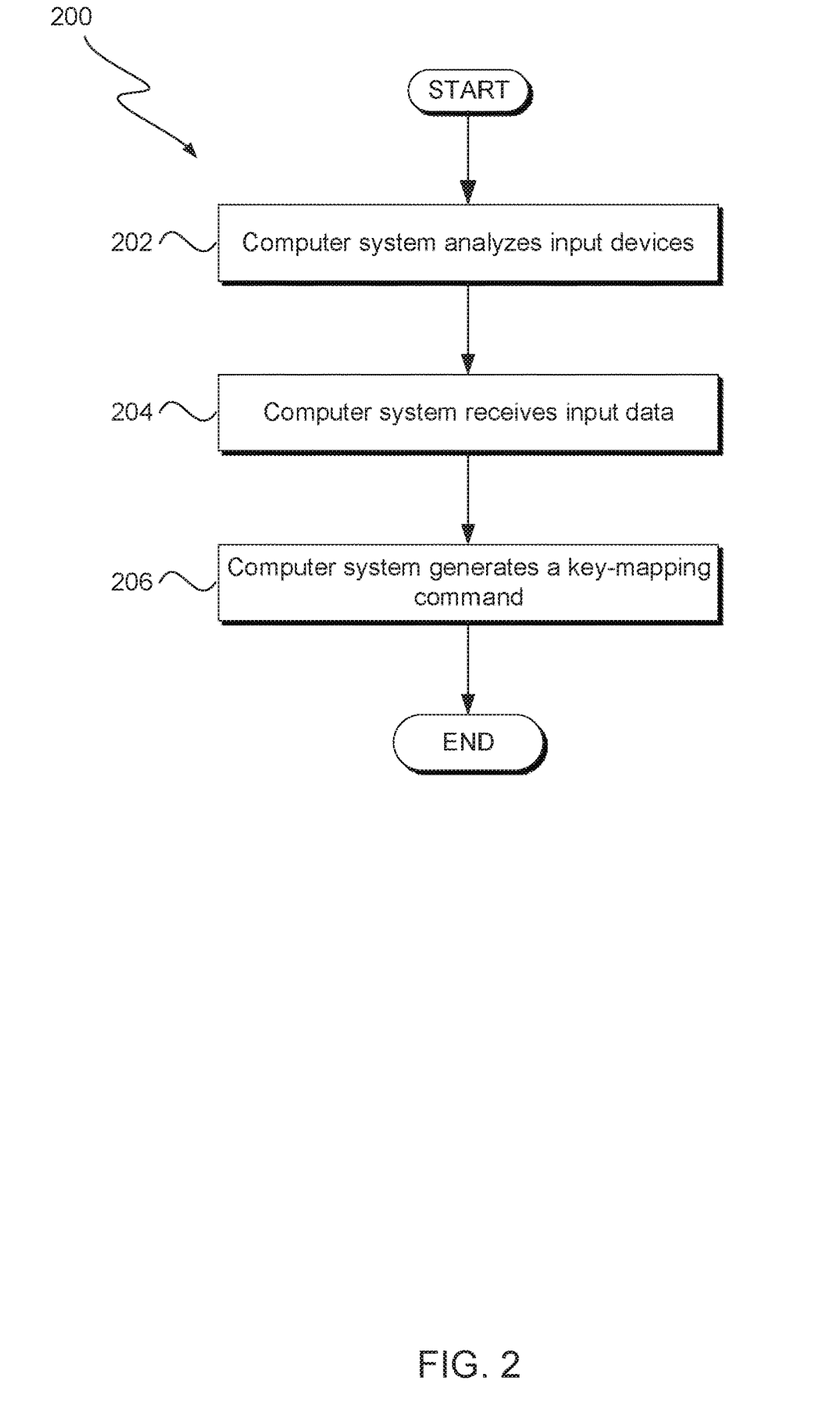
FIG. 2 illustrates operational processes of input devices connected to a computer cluster are configured through machine learning, on a computing device within the environment of FIG. 1, in accordance with an exemplary embodiment of the present invention.

FIG. 2 is a flowchart depicting operation for configuring input devices for computer clusters based, at least, on machine learning for computing environment 100, in accordance with an illustrative embodiment of the present invention. More specifically, FIG. 2 depicts combined overall operations, 200, of activity pattern program 132 executing on SAN 130. In some embodiments, operations 200 represents logical operations of activity pattern program 132, wherein input devices 124A-C represents interaction between logical units executing on computing devices 120A-C. It should be appreciated that FIG. 2 provides an illustration of one implementation and does not imply limitations with regard to the environments in which different embodiments may be implemented. Many modifications to the depicted environment may be made. In one embodiment of operation 200, the series of operations can be performed in any order. In another embodiment, the series of operations, of operation 200, can be performed simultaneously. Additionally, the series of operations, in operation 200, can be terminated at any operation. In addition to the features previously mentioned, any operations, of operation 200, can be resumed at any time.

In operation 202, activity pattern program 132 communicates with operating program 122A-C and scans the various computing devices executing within workstation 140 to analyze the one or more input devices (i.e., input devices 124A-C) connected to the various computing devices. In various embodiments, activity pattern program 132 analyzes the input devices to determine which input devices are present, within workstation 140. As described above, input devices include, but are not limited to, keyboards, computer mouses, webcams, microphones, touch-based OLED screens, etc. In addition to analyzing the input devices and determining which input devices are present within workstation 140, activity pattern program 132 determines which input devices are connected to which computing device within workstation 140. In one example and embodiment, activity pattern program 132 determines that (i) computing device 120A comprises one input device (e.g., a touch-based OLED screen), (ii) computing device 120B comprises two input devices (e.g., a mouse and a keyboard), and (iii) computing device 120C comprises four input devices (e.g., a trackpad, a keyboard, a webcam, and a microphone). Responsive to determining which input devices are connected to which computing device, activity pattern program 132 stores this data on a database to correlate with subsequent input data received from operating programs 122A-C.

In operation 204, activity pattern program 132 receives input data from one or more input devices (i.e., input devices 124A-C) communicatively connected to computing devices (i.e., computing devices 120A-C) located within workstation 140. In various embodiments, activity pattern program 132 communicates with operating programs 122A-C and requests input data from operating programs 122A-C. In an alternative embodiment, operating programs 122A-C periodically communicate input data to activity pattern program 132, as recognized above. Activity pattern program 132 actively analyzes all input data that is received from operating programs executing on computing devices with workstation 140. Additionally, activity pattern program 132 analyzes the input data to identify the content of the input data and determine which input device and computing device the input data is associated with. Activity pattern program 132 stores this data into categories describing (i) the content of the input data, (ii) the input devices, and (iii) the computing device associated with one or more input data. Activity pattern program 132 operates to receive and collect input data until a threshold level is reached, wherein activity pattern program 132 can determine a key-mapping command for the user of workstation 140.

In one example and embodiment, activity pattern program 132 analyzes the input data and identifies (i) the content of the input data, (ii) the input device, and (iii) the computing device associated of each input data received from operating programs 122A-C. Activity pattern program 132 categorizes each input data based, at least in part, on (i) the content of the input data, (ii) the input device, and (iii) the computing device. The categories that the input data is stored in include, but are not limited to, (i) the action performed by the user, (ii) the type of input device, and (iii) which computing device the action was performed on. One having ordinary skill in the art would understand that the actions include, but are not limited to, starting and/or closing an application or a program, selecting a link, highlighting words and/or numbers on a program, etc.

In operation 206, activity pattern program 132 based, at least in part, on the storage and identification of input data, wherein, activity pattern program 132 collects a threshold level of input data, generates a key-mapping command. In various embodiments, activity pattern program 132 generates, at least, a first key-mapping command that comprises a layout that represents shortcuts and/or hotkeys to optimize the one or more input devices connected to the one or more computing devices of workstation 140. As described above, the key-mapping command comprises shortcuts or hotkeys that can be utilized by the user of workstation 140 to optimize the use of the one or more input devices. In one embodiment and example, activity pattern program 132 identifies that the user of workstation 140 utilizes a first input device connected to computing device 120A to start a program on computing device 120A and the user utilizes a second input device connected to computing device 120B to start the identical program as that of computing device 120A. Activity pattern program 132 determines that to optimize the use of the one or more input devices connected to the one or more computing devices of workstation 140, activity pattern program 132 generates a key-mapping command that configures the one or more input devices and presents to the user of workstation 140 a configuration to utilize the first input device connected to computing device 120A to start the program on computing device 120A and computing device 120B. Activity pattern program 132 communicates the key-mapping command to operating programs 122A-C with a set of program instructions to instruct and/or coach the user to utilize the key-mapping command to optimize the use of the one or more input devices connected to the one or more computing devices of workstation 140.

Figure 3:
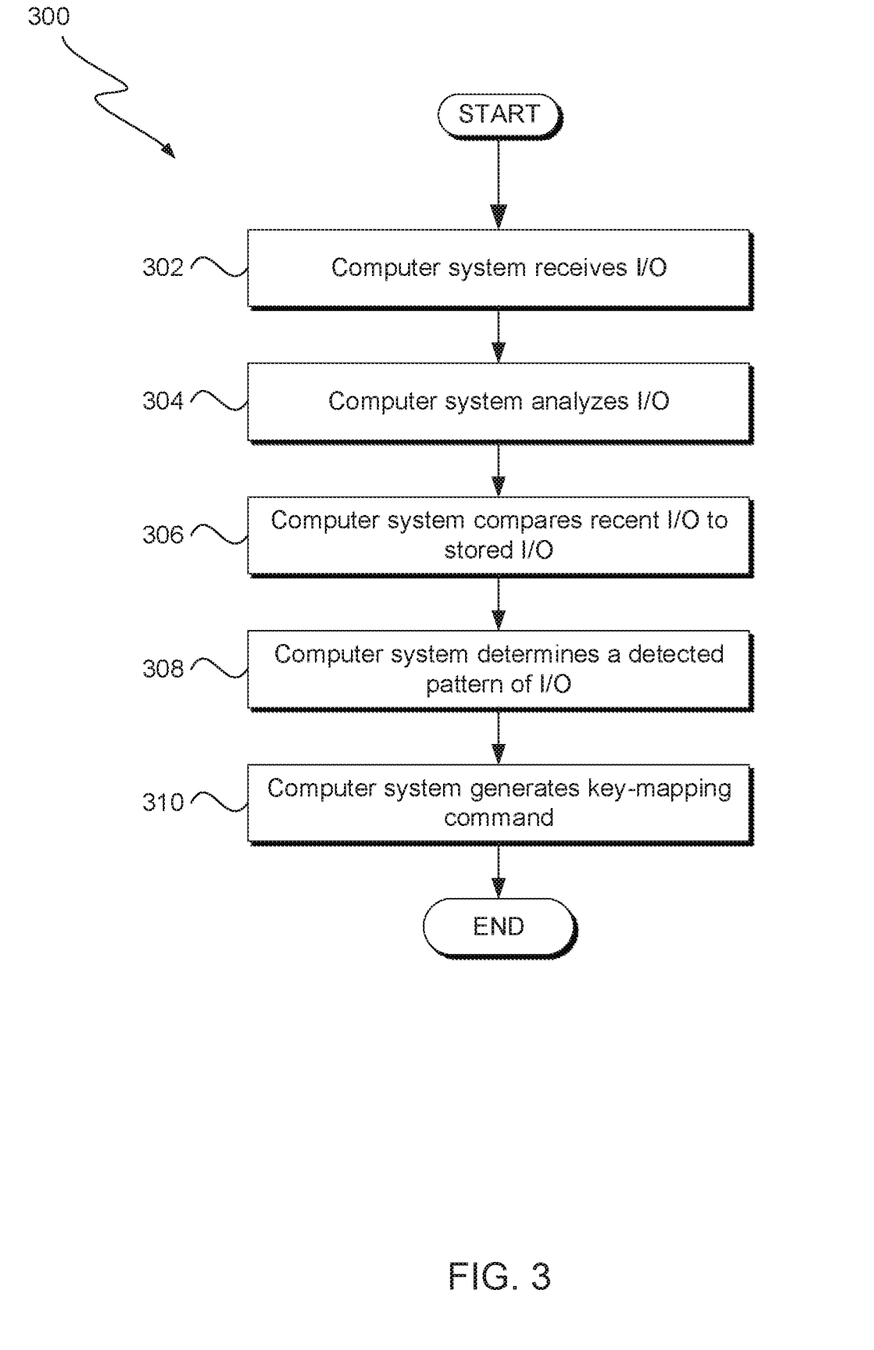
FIG. 3 illustrates operational processors of input devices connected to a computer cluster are configured through machine learning, on a computing device within the environment of FIG. 1, in accordance with an exemplary embodiment of the present invention.

FIG. 3 is a flowchart depicting operations for configuring input devices for computer clusters for computing environment 100, in accordance with an illustrative embodiment of the present invention. More specifically, FIG. 3, depicts combined overall operations, 300, of activity pattern program 132 (stored on SAN 130). In some embodiments, operations 300 represents logical operations of activity pattern program 132, wherein operating programs 122A-C represents interactions between logical units executing on computing devices 120A-C. Further, operations 300 can include a portion or all of combined overall operations of 200, in which case, interactions between operations 200 and 300 represent logic of activity pattern program 132. It should be appreciated that FIG. 3 provides an illustration in which different embodiments may be implemented. Many modifications to the depicted environment may be made. In one embodiment of operation 300, the series of operations can be performed in any order. In another embodiment, the series of operations, of operation 300, can be terminated at any operation. In addition to the features previously mentioned, any operations, of operation 300, can be resumed at any time.

In operation 302, activity pattern program 132 receives input data (i.e., I/O) from operating programs (i.e., operating programs 122A-C) executing on computing devices (i.e., computing devices 120A-C) with workstation 140. The input data represents data based on the actions of the user of workstation 140, more specifically, the input data represents signals from one or more input devices connected to computing devices with workstation 140 based, at least in part, on the actions performed by the user.

In operation 304, activity pattern program 132 analyzes the input data received from operating programs 122A-C, as described above. In response to activity pattern program 132 receiving input data, activity pattern program 132 analyzes the input data to identify (i) the content of the input data, (ii) the input device the input data is associated with, and (iii) which computing device the input device is connected to. Additionally, activity pattern program 132 analyzes the content of the input data to identify the action performed by the user of workstation 140. In one embodiment and example, activity pattern program 132 identifies the action performed that is associated with each input data. In various embodiments, activity pattern program 132 identifies that the action performed by the user of workstation 140 was to start a program and/or application on a computing device within workstation 140. In some embodiments, activity pattern program 132 identifies that the action performed by the user of workstation 140 was to highlight a sequence of words and/or numbers on a program. The present invention recognizes that there are various actions that a user performs on a computing device utilizes various input devices, and further, the present invention does not limit the amount of actions that a user performs on a computing device within computing environment 100.

In operation 306, activity pattern program 132 stores one or more input data received from operating programs 122A-C on a database (e.g., database 134). In various embodiments, activity pattern program 132 analyzes input data that is currently stored on a database (e.g., database 134) and input data that activity pattern program 132 received from operating programs 122A-C at various periods of time. Activity pattern program 132 operates to identify (i) similarities, (ii) redundancies, and/or (iii) patterns associated with the one or more actions performed by a user of workstation 140. Additionally, activity pattern program 132 executes machine learning to identify (i) similarities, (ii) redundancies, and/or (iii) patterns associated with the one or more actions performed by a user of workstation 140. In various embodiments, activity pattern program 132 executes machine learning to identify (i) similarities, (ii) redundancies, and/or (iii) patterns associated with the one or more actions performed by a user of workstation 140 between input data that is stored on a database (e.g., database 134) and input data that is currently received from operating programs 122A-C.

In operation 308, activity pattern program 132, based, at least in part, on the identification of (i) similarities, (ii) redundancies, and/or (iii) patterns associated with the one or more actions performed by a user of workstation 140 between input data that is stored on a database (e.g., database 134) and input data that is currently received from operating programs 122A-C, determines a detected pattern of input data (i.e., I/O). In various embodiments, activity pattern program 132 monitors the input data being received and the input data stored on a database (e.g., database 134), wherein activity pattern program 132 actively analyzes the input data to detect (i) similarities, (ii) redundancies, and/or (iii) patterns associated with the one or more actions performed by a user of workstation 140 for generation of a key-mapping command. In some embodiments, activity pattern program 132 detects a (i) similarity, (ii) redundancy, and/or (iii) pattern between the input data stored on a database (e.g., database 134) and input data currently received from operating programs 122A-C and reaching a threshold level of certainty that a detected pattern of input data exists. In some embodiments, activity pattern program 132 does not detect a (i) similarity, (ii) redundancy, and/or (iii) pattern between the input data stored on a database (e.g., database 134) and input data currently received from operating programs 122A-C and continues to store the received input data on a database (e.g., database 134) and continues to actively monitor the stream of input data.

In operation 310, activity pattern program 132 generates a key-mapping command based, at least in part, on the detection of a (i) similarity, (ii) redundancy, and/or (iii) pattern between the input data stored on a database (e.g., database 134) and input data received from operating programs 122A-C and reaching a threshold level of certainty that a detected pattern of input data exists. In various embodiments, activity pattern program 132 communicates the key-mapping command to operating programs 122A-C to communicate and coach the user of workstation 140 to incorporate the key-mapping command into the one or more input devices connected to the various computing devices of workstation 140. Additionally, activity pattern program 132 communicates a set of program instructions to operating programs 122A-C to incorporate the key-mapping device into input devices 124A-C to perform the specific action associated with the key-mapping command. In some embodiments, activity pattern program 132 communicates a decision to operating programs 122A-C to communicate to the user of workstation 140 asking the user to confirm or deny the key-mapping command to be incorporated into input devices 122A-C. In various embodiments, a user selects to confirm the key-mapping command, wherein operating programs 122A-C, based, at least in part, on a set of program instructions communicated by activity pattern program 132, incorporates the key-mapping command into input devices 124A-C whereby the shortcut and or hotkey is enabled for functionality by the user of workstation 140. In some embodiments, the user of workstation 140 denies the key-mapping command. If a user of workstation 140 denies a key-mapping command a notification is communicated to activity pattern program 132 of the decision of the user and stores the key-mapping command for subsequent use, if the user so desires. Additionally, based, at least in part, on the user denying the key-mapping command, operating programs 122A-C, based, at least in part, on a set of program instructions communicated by activity pattern program 132, does not incorporate the key-mapping command into input devices 124A-C.

Figure 4:
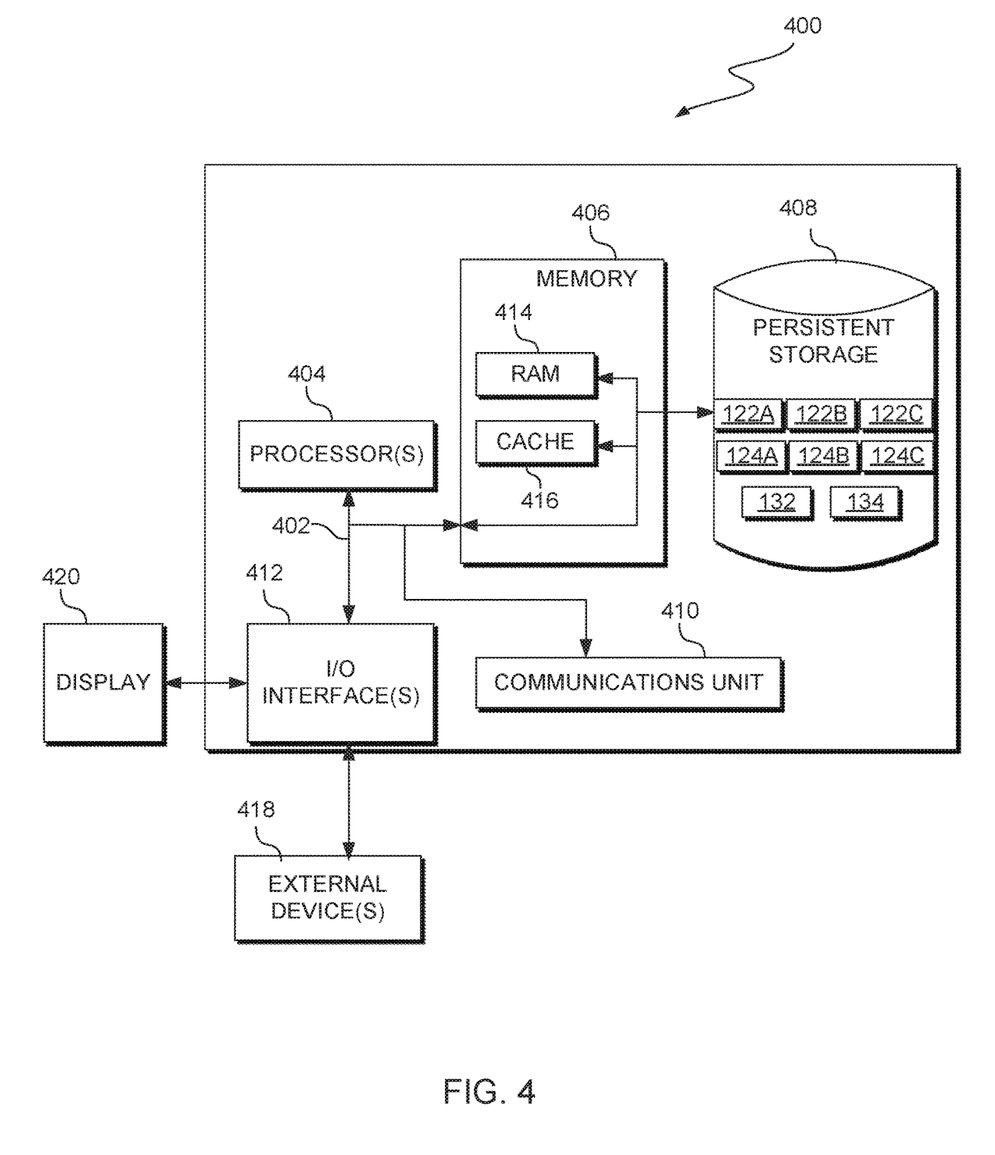
FIG. 4 depicts a block diagram of components of one or more computing devices within the computing environment depicted in FIG. 1, in accordance with an exemplary embodiment of the present invention.

FIG. 4 depicts a block diagram, 400, of components of computing device 120A, computing device 120B, computing device 120C, SAN 130, and workstation 140, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 120A, computing device 120B, computing device 120C, SAN 130, and workstation 140 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Operating program 122A, operating program 122B, operating program 122C, input device 124A, input devices 124B, input device 124C, activity pattern program 132 and database 134 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of network 110. In these examples, communications unit 410 includes one or more network interface cards. Communications unit 410 may provide communications through the use of either or both physical and wireless communications links. Operating program 122A, operating program 122B, operating program 122C, input device 124A, input devices 124B, input device 124C, activity pattern program 132 and database 134 may be downloaded to persistent storage 408 through communications unit 410.

I/O interface(s) 412 allows for input and output of data with other devices that may be connected to Computing device 120A, computing device 120B, computing device 120C, SAN 130, and workstation 140. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., operating program 122A, operating program 122B, operating program 122C, input device 124A, input devices 124B, input device 124C, activity pattern program 132 and database 134, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as, for example, "Smalltalk" and the like may be subject to trademark rights in various jurisdictions throughout the world and are used here only in reference to the products or services properly denominated by the marks to the extent that such trademark rights may exist.

What is claimed is:

1. A computer-implemented method, the method comprising:
    analyzing, by one or more processors, input devices connected to respective computer devices executing within a workstation, wherein the computer devices include at least a first computer device and a second computer device;
    receiving, by one or more processors, a first signal from a first input device connected to the first computer device;
    converting, by one or more processors, the first signal into device data;
    analyzing, by one or more processors, the device data;
    determining, by one or more processors, a pattern of the device data;
    responsive to determining the pattern of the device data, generating, by one or more processors, based, at least in part, on the determined pattern: (i) a first key-mapping command for the first computer device to perform an action on the first computer device and the second computer device, and (ii) a second key-mapping command for the second computer device to perform the action on the first computer device and the second computer device;
    sending, by one or more processors: (i) the first key-mapping command to the first computer device, and (ii) the second key-mapping command to the second computer device;
    receiving, by one or more processors, a second signal from a second input device connected to the second computer, the second signal corresponding to the second key-mapping command; and responsive to receiving the second signal, instructing, by one or more processors, both the first computer device and the second computer device to perform the action.

2. The method of claim 1, wherein:
the first input device is a keyboard; and
the first signal indicates that a key of the keyboard has been pressed.

3. The method of claim 1, wherein:
the first input device is a computer mouse; and
the first signal indicates a click of the computer mouse.

4. The method of claim 1, wherein:
the first input device is a touchscreen; and
the first signal indicates a tap of the touchscreen.

5. The method of claim 1, wherein:
the action includes opening a first program.

6. The method of claim 1, further comprising:
receiving, by one or more processors, a third signal from a third input device connected to the first computer device, the third signal corresponding to the first key-mapping command; and
responsive to receiving the third signal, instructing, by one or more processors, both the first computer device and the second computer device to perform the action.

7. The method of claim 1, further comprising:
prompting, by one or more processors, a user of both the first computing device and the second computing device to validate: (i) use of the first key-mapping command on the first computer device, and (ii) use of the second key-mapping command on the second computer device.

8. A computer program product, the computer program product comprising:
one or more computer-readable storage media and program instructions stored on the one or more computer-readable storage media, the stored program instructions comprising:
program instructions to analyze input devices connected to respective computer devices executing within a workstation, wherein the computer devices include at least a first computer device and a second computer device;
program instructions to receive a first signal from a first input device connected to the first computer device;
program instructions to convert the first signal into device data;
program instructions to analyze the device data;
program instructions to determine a pattern of the device data;
program instructions to, responsive to determining the pattern of the device data, generate based, at least in part, on the determined pattern: (i) a first key-mapping command for the first computer device to perform an action on the first computer device and the second computer device, and (ii) a second key-mapping command for the second computer device to perform the action on the first computer device and the second computer device;
program instructions to send: (i) the first key-mapping command to the first computer device, and (ii) the second key-mapping command to the second computer device;
program instructions to receive a second signal from a second input device connected to the second computer, the second signal corresponding to the second key-mapping command; and program instructions to, responsive to receiving the second signal, instruct both the first computer device and the second computer device to perform the action.

9. The computer program product of claim 8, wherein:
the first input device is a keyboard; and
the first signal indicates that a key of the keyboard has been pressed.

10. The computer program product of claim 8, wherein:
the first input device is a computer mouse; and
the first signal indicates a click of the computer mouse.

11. The computer program product of claim 8, wherein:
the first input device is a touchscreen; and
the first signal indicates a tap of the touchscreen.

12. The computer program product of claim 8, wherein:
the action includes opening a first program.

13. The computer program product of claim 8, the stored program instructions further comprising:
program instructions to receive a third signal from a third input device connected to the first computer device, the third signal corresponding to the first key-mapping command; and
program instructions to, responsive to receiving the third signal, instruct both the first computer device and the second computer device to perform the action.

14. The computer program product of claim 8, the stored program instructions further comprising:
program instructions to prompt a user of both the first computing device and the second computing device to validate: (i) use of the first key-mapping command on the first computer device, and (ii) use of the second key-mapping command on the second computer device.

15. A computer system, the computer system comprising:
one or more computer processors;
one or more computer readable storage medium; and
program instructions stored on the computer readable storage medium for execution by at least one of the one or more processors, the stored program instructions comprising:
program instructions to analyze input devices connected to respective computer devices executing within a workstation, wherein the computer devices include at least a first computer device and a second computer device;
program instructions to receive a first signal from a first input device connected to the first computer device;
program instructions to convert the first signal into device data;
program instructions to analyze the device data;
program instructions to determine a pattern of the device data;
program instructions to, responsive to determining the pattern of the device data, generate based, at least in part, on the determined pattern: (i) a first key-mapping command for the first computer device to perform an action on the first computer device and the second computer device, and (ii) a second key-mapping command for the second computer device to perform the action on the first computer device and the second computer device;
program instructions to send: (i) the first key-mapping command to the first computer device, and (ii) the second key-mapping command to the second computer device;

program instructions to receive a second signal from a second input device connected to the second computer, the second signal corresponding to the second key-mapping command; and program instructions to, responsive to receiving the second signal, instruct both the first computer device and the second computer device to perform the action.

16. The computer system of claim 15, wherein:

the first input device is a keyboard; and the first signal indicates that a key of the keyboard has been pressed.

17. The computer system of claim 15, wherein:

the first input device is a computer mouse; and the first signal indicates a click of the computer mouse.

18. The computer system of claim 15, wherein:

the first input device is a touchscreen; and the first signal indicates a tap of the touchscreen.

19. The computer system of claim 15, wherein:

the action includes opening a first program.

20. The computer system of claim 15, the stored program instructions further comprising:

program instructions to receive a third signal from a third input device connected to the second first computer device, the third signal corresponding to the first key-mapping command; and program instructions to, responsive to receiving the third signal, instruct both the first computer device and the second computer device to perform the action.

* * * * *